(12) United States Patent
Hirata et al.

(10) Patent No.: US 6,441,075 B2
(45) Date of Patent: *Aug. 27, 2002

(54) POLYOLEFIN-BASED RESIN COMPOSITION AND AUTOMOTIVE MOLDED PLASTIC MADE FROM SAME

(75) Inventors: Tomio Hirata, Eaton, OH (US); Kazuo Matsuyama, Shizuoka (JP); Kazuyuki Yamamoto, Shizuoka (JP); Kazushige Ohnishi, Shizuoka (JP); Minoru Adachi; Tamihiro Ohashi, both of Chiba (JP); Motoru Komatsu, Kanagawa (JP); Satoru Ichikawa, Kanagawa (JP); Masahiro Terada, Kanagawa (JP); Hirosuke Kamae, Kanagawa (JP); Akira Kawai, Kanagawa (JP)

(73) Assignees: Nissan Motor Co., Ltd., Yokahama; Nihon Plast Co., Ltd., Fuji; Chisso Corporation, Osaka, all of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/837,874

(22) Filed: Apr. 25, 1997

(30) Foreign Application Priority Data

Apr. 26, 1996 (JP) ................................. 8-107043

(51) Int. Cl.$^7$ .............................. C08K 3/00; C08K 3/34
(52) U.S. Cl. ........................................ 524/423; 524/451
(58) Field of Search .................................. 524/423, 451

(56) References Cited

U.S. PATENT DOCUMENTS

| | | | |
|---|---|---|---|
| 5,283,267 A | 2/1994 | Nishio et al. | 523/216 |
| 5,308,908 A | 5/1994 | Fukui et al. | 524/451 |
| 5,428,091 A | 6/1995 | Abe et al. | 524/260 |
| 5,484,824 A | 1/1996 | Abe et al. | 523/436 |
| 5,599,865 A | 2/1997 | Koizumi et al. | 524/413 |

FOREIGN PATENT DOCUMENTS

| | | |
|---|---|---|
| DE | 44 06 532 | 9/1994 |
| EP | 0 684 281 | 11/1995 |
| EP | 0 695 781 | 2/1996 |
| EP | 0695781 | 2/1996 |
| EP | 0700943 A1 | 3/1996 |
| EP | 739943 | 10/1996 |
| GB | 2281302 | 3/1995 |
| JP | 456649 | 2/1992 |
| WO | 91/04257 | 4/1991 |

OTHER PUBLICATIONS

WPI Accession No. 96–378960.
WPI Accession No. 93–164637.
WPI Accession No. 97–241900.
Japanese Industrial Standard, K–7210, "Testing Method for Melt Flow rate of Thermoplastics" pp.: 453–457, with English translation.
Japanese Industrial Standard, K–7203, "Testing Method for Flexural Properties of Rigid Plastic" pp.: 310–314, with English translation.
Japanese Industrial Standard, K–6758, "Testing Methods for Polypropylenes", pp.: 776–777, with English translation.
Japanese Industrial Standard, K–7110, "Method of Izod Impact Test for Rigid Plastics", pp.: 225–236, with English translation.
Japanese Industrial Standard, K–5400, "Testing Methods for Paints", pp.: 279–286, with English translation.
WPI Accession No. 95–204005.

Primary Examiner—Peter D. Mulcahy
(74) Attorney, Agent, or Firm—Foley & Lardner

(57) ABSTRACT

The invention relates to a polyolefin-based resin composition that is in an amount of 100 wt % in total. This composition includes (a) 60–66 wt % of a crystalline propylene-ethylene block copolymer, (b) 12–20 wt % of an ethylene-propylene copolymer rubber, and (c) 18–25 wt % of an inorganic filler. The block copolymer contains a first segment of a homopolymer of propylene and a second segment of a copolymer of propylene and ethylene, and has an isotactic pentad tacticity of at least 0.96. The ratio of the weight average molecular weight of the block copolymer to the number average molecular weight thereof is not greater than 6. The copolymer rubber contains therein 50–60 wt % of ethylene, and has a Mooney viscosity of from 45 to 55 at 125° C. The inorganic filler is one selected from the group consisting of a talc, a first combination of the talc and a glass fiber, and a second combination of the talc and a whisker. The talc has an average particle diameter of not greater than 2 μm. The glass fiber has an average fiber length of from 5 to 10 mm and an average diameter of from 15 to 20 μm. The whisker has an average fiber length of from 15 to 25 μm and an average diameter of from 0.5 to 1 μm. A molded plastic article made from the resin composition is substantially improved in scratch resistance.

20 Claims, 2 Drawing Sheets

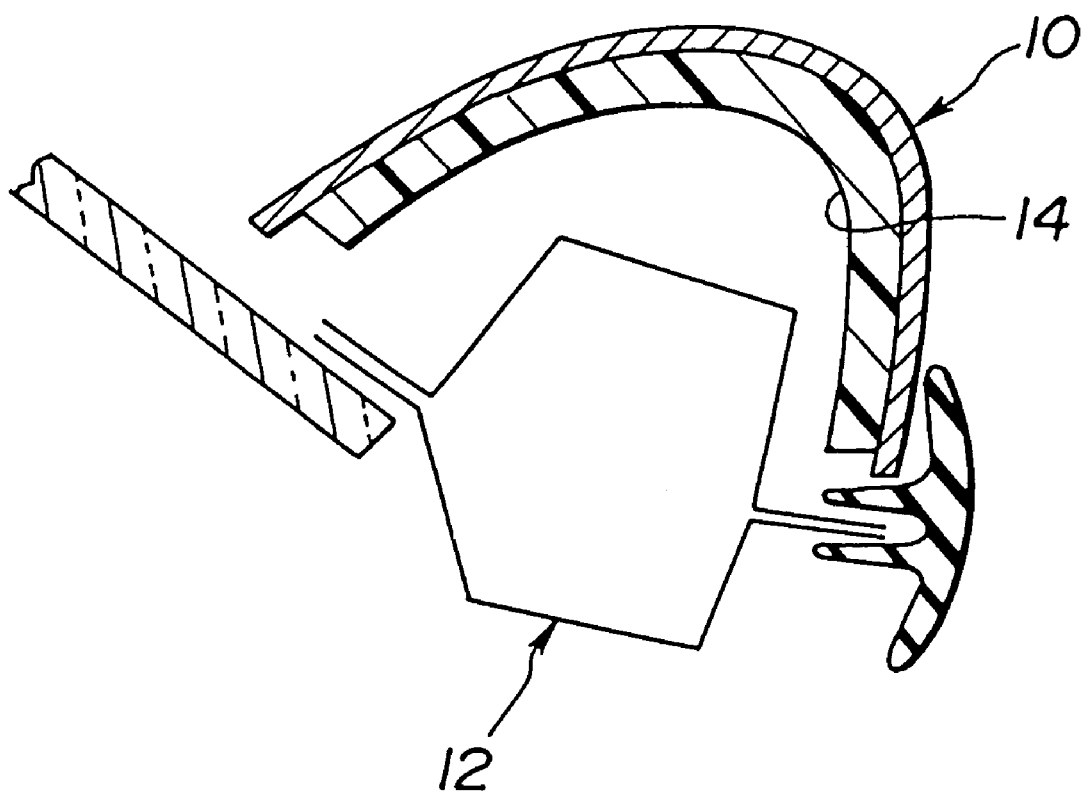

POLYOLEFIN-BASED RESIN COMPOSITION AND AUTOMOTIVE MOLDED PLASTIC MADE FROM SAME

BACKGROUND OF THE INVENTION

The present invention relates to polyolefin-based resin compositions reinforced with filler and to automotive molded plastics made from the resin compositions, such as automotive garnish or trim members, which are disposed in the interior (i.e., passenger compartment) of an automobile, for covering pillars and side roof rails of the automobile. With the use of such plastics, the automobile interior is improved in appearance.

Conventional automotive molded plastics by themselves which are made from conventional polyolefin-based resin compositions are not sufficient in scratch resistance. Some of these plastics are improved in scratch resistance by increasing hardness thereof. They are, however, still not sufficient in scratch resistance. In other words, they have a sufficient resistance to weak scratching caused, for example, by rubbing of cloth, by fingernails, and by other members, but still have an insufficient resistance to strong scratching caused by a sharply cornered object. Thus, conventional automotive molded plastics used, for example, as pillar garnish member (i.e., garnish for covering automotive pillars) may have scratches by a strong impact, for example, of the tongue portion of an automotive seat belt. In FIG. 3, there is shown an automotive pillar garnish member 10 for covering an automotive front pillar 12. This pillar garnish member 10 is made from a thermoplastic resin and has conventional reinforcing ribs 14. The automotive pillar garnish member 10 is required to have characteristics of decoration, stoutness, high rigidity, high quality, and the like. In particular, it is required to have high rigidity at the time of its installation in automobile and at high temperature and high moldability. A thermoplastic resin reinforced with filler (e.g., talc) has good characteristics such as high moldability. An automotive pillar garnish member made from this resin is, however, still insufficient in scratch resistance.

Some of conventional molded plastics, such as plastics used as automotive bumpers, are prepared by adding elastomers to the other components thereof. Such plastics are, however, insufficient in elastic modulus for the use, for example, as pillar garnish member.

SUMMARY OF THE INVENTION

It is therefore an object of the present invention to provide a polyolefin-based resin composition that is capable of providing a molded plastic article which is substantially improved in scratch resistance, while the molded plastic has good characteristics, such as high rigidity, which are comparable to those of conventional pillar garnish members.

It is another object of the present invention to provide such molded plastic article.

According to the present invention, there is provided a polyolefin-based resin composition that is in an amount of 100 wt % in total, said composition comprising:

(a) 60–66 wt % of a crystalline propylene-ethylene block copolymer, said block copolymer comprising a first segment of a homopolymer of propylene and a second segment of a copolymer of propylene and ethylene, said block copolymer having an isotactic pentad tacticity of at least 0.96, a ratio of a weight average molecular weight of said block copolymer to a number average molecular weight of said block copolymer being not greater than 6;

(b) 12–20 wt % of an ethylene-propylene copolymer rubber containing therein 50–60 wt % of ethylene, said rubber having a Mooney viscosity of from 45 to 55 at 125° C.;

(c) 18–25 wt % of an inorganic filler that is one selected from the group consisting of a talc, a first combination of said talc and a glass fiber, and a second combination of said talc and a whisker, said talc having an average particle diameter of not greater than 2 $\mu$m, said glass fiber having an average fiber length of from 5 to 10 mm and an average diameter of from 15 to 20 $\mu$m, and said whisker having an average fiber length of from 15 to 25 $\mu$m and an average diameter of from 0.5 to 1 $\mu$m.

According to the present invention, there is further provided a molded plastic article made from the above polyolefin-based resin composition.

A polyolefin-based resin composition according to the present invention is capable of producing a molded plastic article which is particularly improved in scratch resistance (i.e., resistance to scratching). In other words, a molded plastic article according to the present invention hardly receives substantial damage (e.g., scratches, cuts, marks, and the like) thereon, even if a sharply cornered object (e.g., the tongue portion of an automotive seat belt) hits strongly against the molded plastic article. In the invention, the molded plastic article is provided with good elasticity by the incorporation of the above particular amount of the special copolymer rubber. With this, the molded plastic article is substantially improved in scratch resistance. Furthermore, the inventors have unexpectedly found that Izod impact value of a molded plastic article is an effective parameter for evaluating scratch resistance thereof.

BRIEF DESCRIPTION OF THE DRAWINGS

FIG. 3 is a view similar to FIG. 1, but showing an automotive pillar garnish member having conventional reinforcing ribs.

DESCRIPTION OF THE PREFERRED EMBODIMENTS

Figure 1:
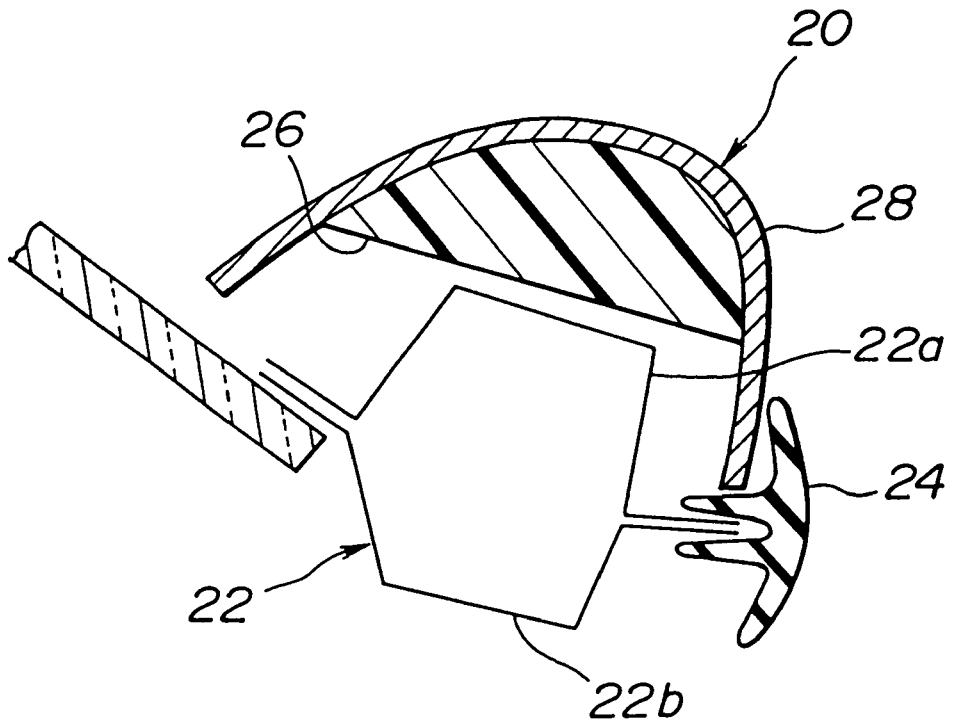
FIG. 1 is a sectional view showing a first automotive pillar garnish member that covers an automotive front pillar and has reinforcing ribs according to a first embodiment of the present invention.

In FIG. 1, there is shown an exemplary first automotive pillar garnish member 20 for covering an automotive front pillar 22 (windshield pillar) disposed between a front windshield and a door glass plate. The front pillar 22 has inner and outer portions 22a and 22b that are attached to each other at their flanges by spot welding or the like. The pillar garnish member 20 is shaped such that the front pillar 22 is fully covered or concealed thereby. According to need for decoration, it is optional to provide the surface of the pillar garnish member 20 with an uneven fine pattern thereon or to cover the same with an outer skin layer that is a synthetic resin or fabric sheet having thereon fibers or the like. A rubber sealing member 24 is provided at one end portion of the pillar garnish member 20 in order to conceal clearance between the pillar garnish member 20 and the front pillar 22 and a welded portion of the front pillar 22. It is preferable that the first automotive pillar garnish member 20 has reinforcing ribs 26 according to a first embodiment of the present invention, as shown in FIG. 1. There is provided in FIG. 2 a second automotive pillar garnish member 30 having reinforcing ribs 32 according to a second embodiment of the present invention. These reinforcing ribs 26 and 32 have sectional shapes that are different from that of the conventional ones 14 shown in FIG. 3. The reinforcing ribs 26 or 32 and a major portion 28 or 34 of the pillar garnish member 20 or 30 constitute a one-piece body. The pillar garnish member 20 or 30 is provided with the reinforcing ribs 26 or 32 for the purpose of suppressing deformation (expansion of a mouth portion) of the pillar garnish member 20 or 30 and of improving the pillar garnish member 20 or 30 in rigidity such as flexural rigidity, torsional rigidity and heat rigidity.

In the invention, when the first combination of the talc and the glass fiber or the second combination of the talc and the whisker is used as the inorganic filler, it is preferable that the weight ratio of the talc to the glass fiber or the whisker is in a range of from 1:1 to 3:1. If it is less than 1:1 or greater than 3:1, a molded plastic article according to the present invention may become improved in rigidity. With this, however, the molded plastic article may become inferior in scratch resistance. In other words, the molded plastic article may have scratches thereon, when the tongue portion of an automotive seat belt hits strongly against this article.

Figure 2:
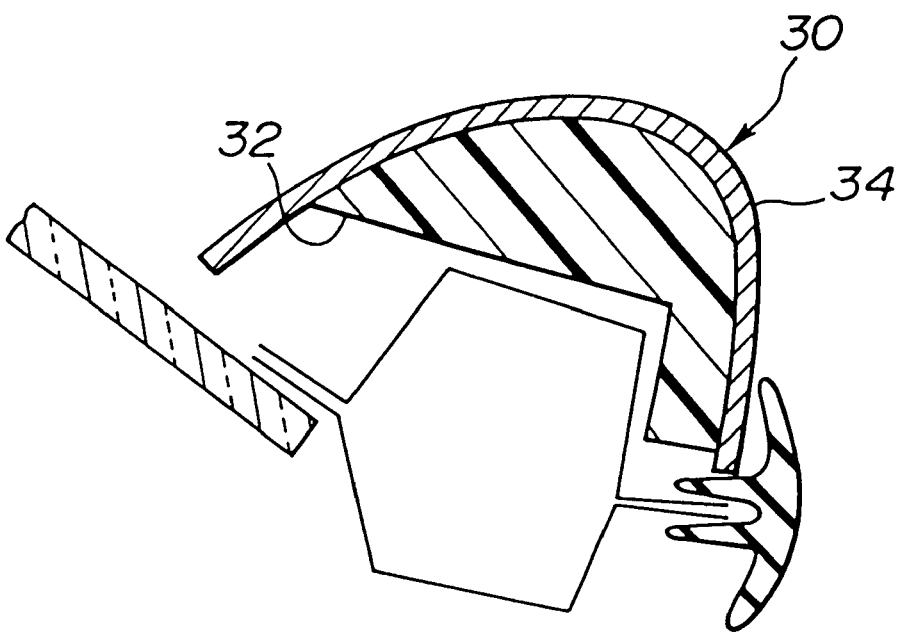
FIG. 2 is a view similar to FIG. 1, but showing a second automotive pillar garnish member having reinforcing ribs according to a second embodiment of the present invention.

In the invention, it is preferable that an automotive garnish member according to the present invention has on the back side thereof a plurality of reinforcing ribs having sectional shapes, for example, as shown in FIGS. 1 and 2. It is preferable that each reinforcing rib has a thickness of from 0.8 to 1.7 mm. If it is less than 0.8 mm, the resin composition may become inferior in moldability. In other words, when an automotive garnish member is formed by injection molding, the resin composition may not be introduced into the whole of the injection mold. With this, the reinforcing ribs may not have their predetermined proper shapes. If it is greater than 1.7 mm, the automotive garnish member may have sink to lower its value as a commercial product. It is preferable that each two of the reinforcing ribs, which are adjacent to each other, has a clearance therebetween of from 5 to 50 mm. In other words, this clearance is preferably up to 50 mm, more preferably up to 30 mm, for the purpose of having sufficient rigidity at the time of the installation of the garnish member and at high temperature. Furthermore, the clearance is preferably at least 5 mm, more preferably at least 15 mm, in view of the mold strength and releasibility from mold. If it is less than 5 mm, a portion of the mold for forming the reinforcing ribs may become inferior in strength. If it is greater than 50 mm, the automotive garnish member may become inferior in rigidity at the time of its installation and at high temperature. Thus, its value as a commercial product may be lowered.

In the invention, if the crystalline propylene-ethylene block copolymer has an isotactic pentad tacticity ($I_5$) less than 0.96 or a ratio of its weight average molecular weight (Mw) to its number average molecular weight (Mn) of greater than 6, the molded plastic article used as an automotive garnish member become's inferior in rigidity and heat resistance. This ratio (Mw/Mn) is also called Q value. The isotactic pentad tacticity ($I_5$) is a parameter for determining the degree of the intramolecular stereoregularity of the block copolymer and can be determined, for example, by measuring the melt flow rate of the block copolymer. When two methyl groups of adjacent propylene monomers in the propylene chain of a polypropylene are on the same side of the main chain of the polypropylene, these methyl groups are designated by "meso" (m). In contrast, when those are on the opposite sides thereof, they are designated by "racemic" (r). Thus, when the consecutive five (pentad) propylene monomers are on the same side thereof, these consecutive five propylene monomers are designated by "mmmm". The ratio of the total number of five consecutive propylene monomers designated by "mmmm" in a polypropylene to the total number of all five consecutive propylene monomers designated by mmmm, mmmr, rmmr, mmrr, mmrm, rmrr, mrmr, rrrr, mrrr and mrrm in the polypropylene is referred to as the isotactic pentad tacticity ($I_5$).

In the invention, the ethylene-propylene copolymer rubber contains therein 50–60 wt % (preferably 52–56 wt %) of ethylene and has a Mooney viscosity ($ML_{1+4}$) of from 45 to 55, preferably from 48 to 52, at 125° C. If the ethylene content of the rubber and its Mooney viscosity are respectively out of ranges of 50–60 wt % and 45–55, the molded plastic article used as an automotive garnish member becomes inferior in resistance to scratches caused by the impact of the tongue portion of an automotive seat belt. Furthermore, the rubber becomes insufficient in dispersibility in the resin composition.

In the invention, the inorganic filler is used for the purpose of improving the molded plastic article in rigidity. The inorganic filler is: one selected from the group consisting of the talc, the first combination of the talc and the glass fiber, and the second combination of the talc and the whisker. The talc has an average particle diameter within a range of not greater than 2 $\mu$m. The glass fiber has an average fiber length within a range of from 5 to 10 mm and an average diameter within a range of from 15 to 20 $\mu$m. The whisker has an average fiber length within a range of from 15 to 25 $\mu$m and an average diameter within a range of from 0.5 to 1 $\mu$m. If the average diameter of the talc is out of the above range, this talc is not capable of achieving the improvement of the molded plastic article in rigidity and in resistance to scratches caused by the impact of the tongue portion of an automotive seat belt. If each of the average fiber length and the average diameter of the glass fiber is out of the above range, this glass fiber is not capable of achieving the above improvement, either If each of the average fiber length and the average diameter of the whisker is out of the above range, this whisker is not capable of achieving the above improvement, either.

As stated above, a polyolefin-based resin composition according to the present invention comprises three components of (a) 60–66 wt % of the crystalline propylene-ethylene block copolymer, (b) 12–20 wt % of the ethylene-propylene copolymer rubber, and (c) 18–25 wt % of the inorganic filler. If each component is in an amount out of the above range, the molded plastic article becomes insufficient in rigidity and in resistance to scratches caused by the impact of the tongue portion of an automotive seat belt.

In the invention, it is optional to add an additive to the resin composition. This additive is at least one selected from the group consisting of antioxidant, antistatic agent, coloring agent (pigment), nucleus forming agent, slipping agent, mold release agent, fire retardant, ultraviolet absorbing agent, light stabilizer, plasticizer, and radical generator.

In the invention, the components and the optional additive of the resin composition may be in the form of powder or granule. The resin composition can be prepared, for example, by mixing the components and the optional additive, using ribbon blender, tumble mixer, Henschel mixer, super mixer, or the like, then by kneading the resultant mixture at a temperature of from 150 to 300° C., preferably from 180 to 250° C., using rollers, Banbury mixer, labo plastomill, single- or twin-screw extruder, or the like, and then by pelletizing the kneaded mixture. The resultant resin composition can be molded into various shapes, by injection molding, injection compression molding, vacuum molding, or extrusion (e.g., extrusion blow molding). Of these molding methods, it is preferable to use injection molding, gas injection molding, or injection compression molding, in the present invention.

When a molded plastic article according to the present invention is used as an automotive garnish (trim) member, it is preferable that the molded plastic article has a melt flow rate of at least 10 g/10 min, a specific gravity of from 1.00 to 1.09, a flexural elastic modulus of at least 1,960 MPa, a Rockwell hardness (R scale) of at least 50, and an Izod impact value of at least 9.8 kJ/m$^2$ at 0° C., under the following measurement conditions. In the invention, the melt flow rate of the molded plastic article is measured at 230° C. under a load of 21.18 N, in accordance with Japanese Industrial Standard (JIS) K 7210. If the melt flow rate is less than 10 g/10 min, the molded plastic article may become inferior in external appearance. In the invention, the flexural elastic modulus is measured at 23° C. in accordance with JIS K 7203. If the flexural elastic modulus is lower than 1,960 MPa, the molded plastic article may become insufficient in rigidity at the time of installation and at high temperature. With this, it may become insufficient in stoutness and may become large in deformation at high temperature. In the invention, the Rockwell hardness is measured in accordance with JIS K 6758, under R scale. If the Rockwell hardness is lower than 50, the molded plastic article may become inferior in scratch resistance. Thus, it may have scratches thereon, when it is released from a mold, or when it is handled in a factory. In the invention, the Izod impact value is measured at 0° C. and 23° C., by making a notch on the molded plastic article, in accordance with JIS K 7110. If the Izod impact value is lower than 9.8 kJ/m$^2$, the molded plastic article may have scratches thereon by the impact of a sharply cornered object Such as the tongue portion of an automotive seat belt.

In the invention, it is preferable that the reinforcing ribs are formed such that clearance between the reinforcing ribs and the automotive pillar is at least 0.5 mm. With this, there can be suppressed noise generated by closely positioning the reinforcing ribs relative to the pillar. Furthermore, this clearance allows a certain production error of the pillar in dimension.

It is optional to use a molded plastic article of the present invention as a core of an automotive trim (garnish) member having thereon an outer skin member (e.g., a synthetic resin sheet or a fabric sheet). This outer skin member is optionally formed thereon with fibers and the like. As mentioned hereinabove, a resin composition of the present invention is superior in moldability, and a molded plastic article made from this resin composition is superior in rigidity and scratch resistance. Therefore, the molded plastic article can be used, for example, for various automotive parts such as pillar trim member, door trim member, and instrument panel. The molded plastic article used as an automotive trim member may effectively absorb the energy of the impact of an automotive passenger on the article.

The following nonlimitative examples are illustrative of the present invention.

EXAMPLE 1

At first, as shown in Table, 64 wt % of a first crystalline propylene-ethylene block copolymer (PP-1), 13 wt % of an ethylene-propylene copolymer rubber (EPR), and 23 wt % of a talc (filler) were mixed together for 2 min. using Henschel mixer. Then, the resultant mixture was kneaded and extruded by using a single-screw extruder, NVC-50 of Nakatani Kikai Co., and then was pelletized. The PP-1 had a first segment of a homopolymer of propylene and a second segment of a copolymer of propylene and ethylene. The PP-1 had a melt flow rate of 20 g/10 min. at 230° C. under a load of 21.18 N, an isotactic pentad tacticity of 0.980, a ratio of its weight average molecular weight (Mw) to its number average molecular weight (Mn) of 5.5. The EPR contained 54% of ethylene and had a Mooney viscosity ($ML_{1+4}$) of 50 at 125° C. The talc had an average particle diameter of 1.7 μm.

The resultant pellets were subjected to the melt flow rate test. In this test, the melt flow rate was measured at 230° C. under a load of 21.18 N, in accordance with JIS K 7210, as stated above. The result of this test is shown in Table.

A test piece of the molded plastic article was prepared from the pellets by injection molding at a molding temperature of 220° C. and at a mold temperature of 50° C. This test piece was subjected at 23° C. to a tensile test according to JIS K 7113, a flexural elastic modulus (three-point flexural elastic modulus) test according to JIS K 7203, an Izod impact strength test according to JIS K 7110, a heat distortion temperature test according to JIS K 7203 under a load of 0.45 MPa, and a Rockwell hardness test (R scale): according to JIS K 7202. The Izod impact strength test was conducted at temperatures of 23° C. and 0° C., by making a notch on the test piece. The results of these tests are shown in Table.

A pillar garnish member was prepared from the pellets, by using an injection molding machine of a mold clamping force of 350 ton, at a molding temperature of 220° C. In this preparation, the surface of the pillar garnish member was provided with an uneven fine pattern. The pillar garnish member 20 was formed with reinforcing ribs 26 having a shape shown in FIG. 1 and had a major portion 28 having a thickness of 2.5 mm. The pillar garnish member was subjected to an external appearance test. In this test, the surface of the pillar garnish member was observed with the naked eye to check whether or not sink exists thereon. In Table "A" means that sink did not exist on the surface of the pillar garnish member, and "B" means that it existed thereon. The pillar garnish member was further subjected to a scratch test. In this test, the metal tongue portion of an automotive seat belt was allowed to fall on the pillar garnish member from a height of 1.5 m. After the test, the surface of the pillar garnish member was observed with the naked eye to check whether or not scratches exist thereon. In Table, "A" means that scratches did not exist thereon, and "B" means that they existed thereon. The pillar garnish was further subjected to a heat cycle test. In this test, the pillar garnish was installed in an automobile body, and then was subjected to a heat cycle of from −40° C. to 90° C. four times. After that, the pillar garnish member was observed to check whether or not it has the original shape and thus can mate properly with another member. In Table, "A" means that it had the original shape and thus could mate properly with another member, and "B" means that it did not have that and could not mate properly with that.

EXAMPLES 2–4

In each of these examples, a pillar garnish member was prepared by using the pellets of Example 1, in the same manner as that of Example 1, except in that selective changes were made in the thickness of the reinforcing ribs of the pillar garnish member and in the clearance between each two of the reinforcing ribs thereof, as shown in Table. Then, the evaluation tests of Example 1 were conducted on each pillar garnish member.

EXAMPLE 5

In this example, a pillar garnish member was prepared by using the pellets of Example 1, in the same manner as that of Example 1, except in that the thickness of the reinforcing ribs of the pillar garnish member was changed, as shown in Table, and that the shape of the reinforcing ribs was changed to that shown in FIG. 2. Then, the evaluation tests of Example 1 were conducted on the pillar garnish member.

EXAMPLES 6–9

In each of these examples, Example 1 was repeated except in that selective changes were made in the kinds and the amounts of the components of the resin composition, that the thickness of the reinforcing ribs of the pillar garnish member was changed, as shown in Table, and that the shape of the reinforcing ribs was changed to that shown in FIG. 2. In each of Examples 7–9, there was used, in place of PP-1, another crystalline propylene-ethylene copolymer (PP-2) that had the same characteristics as those of PP-1, except that the melt flow rate at 230° C. under a load of 21.18 N was 30 g/10 min. In Example 8, there was used, in addition to the talc, 5 wt % of whiskers that were made of basic magnesium sulfate and had an average fiber length of 20 $\mu$m and an average diameter of 0.7 $\mu$m. In Example 9, there was used, in addition to the talc, glass fibers having an average fiber length of 6 mm and an average diameter of 17 $\mu$m.

COMPARATIVE EXAMPLE 1

In this comparative example, Example 1 was repeated except in that selective changes were made in the kinds and the amounts of the components of the resin composition, that the thickness of the reinforcing ribs of the pillar garnish member was changed, as shown in Table, and that the shape of the reinforcing ribs was changed to that shown in FIG. 2. In fact, there was used, in place of PP-1, still another crystalline propylene-ethylene copolymer (PP-3) that had the same characteristics as those of PP-1, except that the isotactic pentad tacticity was 0.978 and the ratio of Mw/Mn (Q value) was 10.0.

COMPARATIVE EXAMPLE 2

In this comparative example, a pillar garnish member was prepared by using the pellets of Example 1, in the same manner as that of Example 1, except in that the thickness of the reinforcing ribs of the pillar garnish member was changed, as shown in Table, and that the shape of the reinforcing ribs was changed to that shown in FIG. 3. Then, the evaluation tests of Example 1 were conducted on each pillar garnish member.

COMPARATIVE EXAMPLES 3–4

In each of these examples, a pillar garnish member was prepared by using the pellets of Example 1, in the same manner as that of Example 1, except in that selective changes were made in the thickness of the reinforcing ribs of the pillar garnish member and in the clearance between each two of the reinforcing ribs thereof, as shown in Table, and that the shape of the reinforcing ribs was changed to that shown in FIG. 2.

TABLE

| | Ex. 1 | Ex. 2 | Ex. 3 | Ex. 4 | Ex. 5 | Ex. 6 | Ex. 7 |
|---|---|---|---|---|---|---|---|
| Reinforcing Ribs Thickness (mm) | 1.0 | 1.0 | 1.5 | 1.7 | 1.5 | 1.5 | 1.5 |
| Reinforcing Ribs Clearance (mm) | 20 | 50 | 20 | 20 | 20 | 20 | 20 |
| Resin Composition (wt %) | | | | | | | |
| PP-1 | 64 | | | | | 61 | |
| PP-2 | | | | | | | 61 |
| PP-3 | | | | | | | |
| EPR | 13 | | | | | 15 | 15 |
| Talc | 23 | | | | | 24 | 24 |
| Glass Fibers | | | | | | | |
| Whiskers | | | | | | | |
| Test Sample Characteristics | | | | | | | |
| Melt Flow Rate (g/10 min) | 14 | | | | | 10 | 18 |
| Tensile Strength (MPa) | 21.6 | | | | | 19.1 | 19.1 |
| Elongation in Tensile Test (%) | 90 | | | | | 80 | 50 |
| Flexural Elastic Modulus (MPa) | 2452 | | | | | 2069 | 2079 |
| Flexural Strength (MPa) | 30.9 | | | | | 26 | 26 |
| Izod Impact Value at 23° C. (kJ/m$^2$) | >40 | | | | | >40 | >40 |
| Izod Impact Value at 0° C. (kJ/m$^2$) | 9.8 | | | | | >40 | >40 |
| Heat Distortion Temp. (° C.) | 135 | | | | | 125 | 125 |

TABLE-continued

| | | | | | | | |
|---|---|---|---|---|---|---|---|
| Rockwell Hardness (R Scale) Pillar Garnis Member Characteristics | 70 | | | | | 53 | 53 |
| Ext. Appearance Test | A | A | A | A | A | A | A |
| Scratch Test | A | A | A | A | A | A | A |
| Heat Cycle Test | A | A | A | A | A | A | A |

| | Ex. 8 | Ex. 9 | Com. Ex. 1 | Com. Ex. 2 | Com. Ex. 3 | Com. Ex. 4 |
|---|---|---|---|---|---|---|
| Reinforcing Ribs Thickness (mm) | 1.5 | 1.5 | 1.5 | 1.5 | 2.0 | 1.5 |
| Reinforcing Ribs Clearance (mm) | 20 | 20 | 20 | 20 | 20 | 80 |
| Resin Composition (wt %) | | | | | | |
| PP-1 | | | | | | |
| PP-2 | 65 | 66 | | | | |
| PP-3 | | | 86 | | | |
| EPR | 15 | 15 | | | | |
| Talc | 15 | 12 | 14 | | | |
| Glass Fibers | | 7 | | | | |
| Whiskers | 5 | | | | | |
| Test Sample Characteristics | | | | | | |
| Melt Flow Rate (g/10 min) | 20 | 10 | 21 | | | |
| Tensile Strength (MPa) | 18.1 | 36.8 | 28.9 | | | |
| Elongation in Tensile Test (%) | 60 | 10 | 26 | | | |
| Flexural Elastic Modulus (MPa) | 2069 | 2040 | 2500 | | | |
| Flexural Strength (MPa) | 24.9 | 44.1 | 42.7 | | | |
| Izod Impact Value at 23° C. (kJ/m$^2$) | >40 | >40 | 5.2 | | | |
| Izod Impact Value at 0° C. (kJ/m$^2$) | >40 | >40 | 4.2 | | | |
| Heat Distortion Temp. (° C.) | 120 | 155 | 135 | | | |
| Rockwell Hardness (R Scale) Pillar Garnis Member Characteristics | 52 | 76 | 93 | | | |
| Ext. Appearance Test | A | A | A | A | B | A |
| Scratch Test | A | A | B | A | A | A |
| Heat Cycle Test | A | A | A | B | A | B |

The entire disclosure of Japanese Patent Application No. 8-107043 filed on Apr. 26, 1996, including specification, claims, drawings and summary, is incorporated herein by reference in its entirety.

What is claimed is:

1. A polyolefin-based resin composition that is in an amount of 100 wt % in total, said composition consisting essentially:
   (a) 60–66 wt % of a crystalline propylene-ethylene block copolymer, said block copolymer comprising a first segment of a homopolymer of propylene and a second segment of a copolymer of propylene and ethylene, said block copolymer having an isotactic pentad tacticity of at least 0.96, a ratio of a weight average molecular weight of said block copolymer to a number average molecular weight of said block copolymer being not greater than 6;
   (b) 12–20 wt % of an ethylene-propylene copolymer rubber containing therein 50–60 wt % of ethylene, said rubber having a Mooney viscosity of from 45 to 55 at 125° C.;
   (c) 18–25 wt % of an inorganic filler that is one selected from the group consisting of a talc, a first combination of said talc and a glass fiber, and a second combination of said talc and a whisker, said talc having an average particle diameter of not greater than 2 μm, said glass fiber having an average fiber length of from 5 to 10 mm and an average diameter of from 15 to 20 μm, and said whisker having an average fiber length of from 15 to 25 μm and an average diameter of from 0.5 to 1 μm.

2. A resin composition according to claim 1, wherein said inorganic filler is said talc.

3. A resin composition according to claim 1, wherein said inorganic filler is said first combination, and a weight ratio of said talc to said glass fiber is from 1:1 to 3:1.

4. A resin composition according to claim 1, wherein said inorganic filler is said second combination, and a weight ratio of said talc to said whisker is from 1:1 to 3:1.

5. A resin composition according to claim 1, wherein said ethylene-propylene copolymer rubber has a Mooney viscosity of from 48 to 52 at 125° C.

6. A resin composition according to claim 1, wherein said ethylene-propylene copolymer rubber contains 52–56 wt % of ethylene.

7. A resin composition according to claim 1, wherein said whisker is made of basic magnesium sulfate.

8. A method of using the resin composition according to claim 1 in the manufacture of a molded plastic article, comprising molding the resin composition into a desired shape to form the molded plastic article.

9. A method of using the resin composition according to claim 8, wherein said molded plastic article has a melt flow rate of at least 10 g/10 min, a specific gravity of from 1.00 to 1.09, a flexural elastic modulus of at least 1,960 MPa, and an Izod impact value of at least 9.8 kJ/m$^2$ at 0° C.

10. A method of using the resin composition according to claim 8, wherein said molded plastic article is an automobile garnish member for covering a part of an automobile.

11. A method of using the resin composition according to claim 10, wherein said part of said automobile is one of an automotive pillar and an automotive door.

12. A method of using the resin composition according to claim 8, wherein said molded plastic article is an automotive instrument panel.

13. A method of using the resin composition according to claim 11, wherein said automotive pillar is one of front, center and rear pillars of a vehicle body of said automobile.

14. A method of using the resin composition according to claim 11, wherein said automotive garnish member has a major portion and a plurality of reinforcing ribs that extend from said major portion toward said pillar such that said reinforcing ribs are positioned between said major portion and said pillar, and wherein said reinforcing ribs are arranged such that a clearance between said reinforcing ribs and said pillar is at least 0.5 mm.

15. A method of using the resin composition according to claim 14, wherein each of said reinforcing ribs has a thickness of from 0.8 to 1.7 mm, and wherein said reinforcing ribs are arranged such that a distance between two of said reinforcing ribs, which two are adjacent to each other, is from 5 to 50 mm.

16. A method of using the resin composition according to claim 8, wherein said molded plastic article has a Rockwell hardness of at least 50 under R scale.

17. A method of using the resin composition according to claim 15, wherein said distance is from 15 to 30 mm.

18. A method of using the resin composition according to claim 8, wherein the molding of the resin composition into the molded plastic article comprises the steps of:

(a) stirring said resin composition;

(b) melting said resin composition obtained by the step (a) at a temperature of from 150 to 300° C., thereby to prepare a melt;

(c) pelletizing said melt into pellets; and (d) molding said pellets into said molded plastic article.

19. A method of using the resin composition according to claim 18, wherein said temperature of the step (b) is from 180 to 250° C.

20. A method of using the resin composition according to claim 18, wherein the step (d) is conducted by one of injection molding, gas injection molding, and injection compression molding.

* * * * *